(12) United States Patent
Covell et al.

(10) Patent No.: US 7,536,078 B2
(45) Date of Patent: May 19, 2009

(54) IDENTIFICATION OF BLANK SEGMENTS IN A SET OF VISUAL RECORDING DATA

(75) Inventors: Michele M. Covell, Los Altos Hills, CA (US); Harold G. Sampson, Sunnyvale, CA (US); Jeffrey L. Edwards, San Jose, CA (US)

(73) Assignee: YesVideo, Inc., Santa Clara, CA (US)

( * ) Notice: Subject to any disclaimer, the term of this patent is extended or adjusted under 35 U.S.C. 154(b) by 1487 days.

(21) Appl. No.: 10/083,676

(22) Filed: Feb. 25, 2002

(65) Prior Publication Data

US 2002/0154885 A1 Oct. 24, 2002

(51) Int. Cl.
*H04N 5/91* (2006.01)
*H04N 5/14* (2006.01)

(52) U.S. Cl. .................................. 386/46; 348/700

(58) Field of Classification Search ........................ None
See application file for complete search history.

(56) References Cited

U.S. PATENT DOCUMENTS

| | | | |
|---|---|---|---|
| 5,151,788 A | 9/1992 | Blum | 358/188 |
| 6,061,471 A | 5/2000 | Coleman, Jr. | 382/173 |
| 6,100,941 A * | 8/2000 | Dimitrova et al. | 348/700 |
| 6,195,458 B1 | 2/2001 | Warnick et al. | 382/173 |

FOREIGN PATENT DOCUMENTS

WO   WO 96/08921   3/1996

* cited by examiner

*Primary Examiner*—Thai Tran
*Assistant Examiner*—Heather R Jones
(74) *Attorney, Agent, or Firm*—David R. Graham

(57) ABSTRACT

The invention identifies a blank segment (i.e., a segment that does not correspond to recorded visual content) in a set of visual recording data. The invention identifies a blank segment using a blank frame detector that is adapted to evaluate a frame of visual recording data to determine whether the frame of visual recording data is a blank frame, and a blank segment detector that is adapted to evaluate a characteristic of a group of frames of visual recording data to determine whether the group of frames of visual recording data is a blank segment comprising a plurality of blank frames. Identification of a blank segment can be used to, for example, decide whether to terminate digitization of a set of analog visual recording data.

84 Claims, 1 Drawing Sheet

IDENTIFICATION OF BLANK SEGMENTS IN A SET OF VISUAL RECORDING DATA

BACKGROUND OF THE INVENTION

1. Field of the Invention

This invention relates to processing visual recording data and, in particular, to evaluation of a set of visual recording data to identify whether the set of visual recording data includes one or more segments that do not correspond to recorded visual content.

2. Related Art

A set of visual recording data representing recorded visual content can include one or more segments that do not correspond to recorded visual content. For example, a break between two segments of recorded visual content (e.g., a break between a visual recording of a first scene or event and a visual recording of a second scene or event) can be delineated by a segment of visual recording data representing a constant color (e.g., blue, silver, black) or static ("snow").

It is sometimes desirable to identify segments of a set of visual recording data that do not correspond to recorded visual content. For example, a videotape often includes recorded visual content only up to a certain point on the videotape; an end section of the videotape (which can be quite long and, in some cases, may comprise most of the videotape) is a blank section that does not include any recorded visual content. When converting the analog visual recording data stored on a videotape including a blank section at the end of the videotape to digital visual recording data to be stored on a digital data storage device, such as a DVD or CD-ROM, either the entire videotape must be processed or a determination must be made regarding when the blank section begins so that processing of the videotape can be terminated at that point. Processing the entire videotape is disadvantageous. This is because the apparatus used to process the videotape is occupied for longer than necessary (which can reduce the capacity of that apparatus to be used for other processing). This is also because the set of digital visual recording data produced by processing the videotape is larger than necessary (due to the data corresponding to the blank section), which can require more or larger digital data storage device(s) than are necessary (for example, when transferring video footage from a videotape to one or more DVDs or CD-ROMs, "blank" footage at the end of the videotape may require extra disks to be created that contain only footage without a true video signal). Therefore, it is desirable to identify when the blank section begins so that visual recording data after that point need not be processed.

It can also be desirable to identify segments of a set of visual recording data that do not correspond to recorded visual content in other situations and for other purposes. For example, it can be desirable to identify such segments to facilitate editing of a set of visual recording data. It can also be desirable to identify such segments to enable the segments to be eliminated so that the visual recording data requires less data storage capacity and/or so that a display of the visual recording data does not include a display of those segments.

SUMMARY OF THE INVENTION

According to the invention, a blank segment that does not correspond to recorded visual content is identified in a set of visual recording data. The invention identifies a blank segment using a blank frame detector that is adapted to evaluate a frame of visual recording data to determine whether the frame of visual recording data is a blank frame, and a blank segment detector that is adapted to receive input from one or more blank frame detectors regarding a group of frames of visual recording data and to evaluate a characteristic of the group of frames of visual recording data to determine whether the group of frames of visual recording data is a blank segment that does not correspond to recorded visual content. The invention can advantageously be implemented so that blank segments are detected in "real time," either as a set of visual recording data is acquired or as a set of visual recording data is being processed for another purpose (e.g., as a set of analog visual recording data is digitized).

The blank frame detector can be adapted to detect blank frames of a particular type. Alternatively, the blank frame detector can be adapted to detect blank frames of multiple types. The invention can also make use of multiple blank frame detectors. The multiple blank frame detectors can include blank frame detectors that are adapted to detect blank frames of a particular type. In particular, the multiple blank frame detectors can include blank frame detectors that are adapted to detect a particular type of blank frame that is different from the type of blank frame detected by at least one other of the multiple blank frame detectors.

A blank frame detector for use with the invention can be adapted to detect frames of visual recording data that represent an image that is all or nearly all one color (single color image). For example, the invention can make use of blank frame detectors that are adapted to detect frames of visual recording data that represent an image that is all or nearly all blue or purple (blue screen), frames of visual recording data that represent an image that is all or nearly all silver (silver screen) or frames of visual recording data that represent an image that is all or nearly all black (black screen). A blank frame detector that is adapted to detect a single color image can be implemented so that a single color image is detected if the following conditions are met: 1) for each color component, the numerical value of, a specified number of the pixels of a frame are within a specified magnitude of the average numerical value of that color component for all of the pixels of the frame, and 2) the average numerical value of each color component for all of the pixels of the frame is within a specified range and/or has a specified relationship with the average numerical value of one or more other color components. The particular instantiation of the conditions can depend on the type of single color image being detected.

A blank frame detector for use with the invention can also be adapted to detect frames of visual recording data that represent an image that is all or nearly all snow-static (snow-static frame). A blank frame detector that is adapted to detect a snow-static image can be implemented so that a snow-static image is detected if each of the following conditions are met: 1) a specified maximum variation from pure gray at each pixel is less than a specified magnitude, 2) the average numerical value of each color component for all of the pixels of the frame is within a specified range and/or has a specified relationship with the average numerical value of one or more other color components, 3) the vertical and horizontal correlation coefficients are within corresponding specified ranges and/or have a specified relationship with one another.

The blank segment detector can be adapted to detect blank segments including blank frames of a particular type. Alternatively, the blank segment detector can be adapted to detect blank segments including blank frames of multiple types (either multiple types of blank segments that each include blank frames of a particular type, or blank segments that include blank frames of multiple types). The invention can also make use of multiple blank segment detectors. The multiple blank segment detectors can include, as discussed above, blank segment detectors that are adapted to detect blank segments including blank frames of a particular type or blank segment detectors that are adapted to detect blank segments including blank frames of multiple types. In particular, the multiple blank segment detectors can include blank segment detectors that are adapted to detect blank segments including a particular type of blank frame that is different from the type of blank frame included in the blank segments detected by at least one other of the multiple blank segment detectors.

A blank segment detector for use with the invention can be adapted to detect a blank segment (a single color blank segment) that includes frames of visual recording data that represent a single color image of a particular color. For example, the invention can make use of blank segment detectors that are adapted to detect blank segments including frames of visual recording data that represent an image that is all or nearly all blue or purple (blue screen segments), frames of visual recording data that represent an image that is all or nearly all silver (silver screen segments), or frames of visual recording data that represent an image that is all or nearly all black (black screen segments). A blank segment detector that is adapted to detect a single color blank segment can be implemented so that a single color blank segment is detected if the following conditions are met: 1) there are a specified number of frames in a sequence of frames that have been determined to be blank frames of the same color, and 2) the blank frames of the same color in the sequence of frames differ in color by no more than a specified amount.

A blank segment detector for use with the invention can also be adapted to detect a blank segment (snow-static segment) that includes frames of visual recording data that represent a snow-static frame. A blank segment detector that is adapted to detect a snow-static segment can be implemented so that a snow-static segment is detected if the following condition is met: there are a specified number of frames in a sequence of frames that have been determined to be snow-static frames. A blank segment detector that is adapted to detect a snow-static segment can also be implemented so that a snow-static segment is detected if the following conditions are met: 1) a specified minimum number of frames in the sequence of frames have been identified as snow-static frames, 2) a specified number of frames in the sequence of frames have been identified either as black screen frames or snow-static frames, and 3) the black screen frames in the sequence of frames differ in color by no more than a specified amount.

In some cases, it can be desirable to confirm a blank frame determination made by the invention. The invention can be implemented to enable evaluation of a previous blank frame determination to either confirm or reject that determination. For example, a detection of a snow-static frame can be confirmed by evaluating the temporal correlation coefficient over a specified window of frames of visual recording data that includes the snow-static frame.

The categorization of frames of visual recording data produced by the invention can also be used to identify segment boundaries in the set of visual recording data by, for example, comparing the categorization of a group of the most recently categorized frames to the categorization of the current segment. The segment boundaries identified by the invention can be used, for example, to augment or revise segment boundaries established in the set of visual recording data by another, previous process (e.g., shot detection).

The invention can also be implemented to confirm initial blank segment determinations made by the invention. This can be done, for example, by modifying the blank segment detectors used to make the initial blank segment determinations and using the modified blank segment detectors to evaluate together all of the frames in each of the initially identified blank segments.

The invention can be used for a variety of purposes. Blank segment(s) identified by the invention can be removed from a set of visual recording data. This can be desirable, for example, to reduce the amount of data storage capacity used by the set of, visual recording data. Blank segment(s) identified by the invention can be "hidden" during interaction with the set of visual recording data (e.g., during generation of a display from the visual recording data or during processing, such as filtering, of the visual recording data). This can be desirable to facilitate (e.g., make more enjoyable or speed up) viewing a display generated from the visual recording data or to make processing of the visual recording data more efficient (e.g., avoid processing visual recording data that does not represent visual recording content). The invention can also be used to identify and monitor blank segment(s) during a digitization process to enable digitization to be stopped when it is determined that the visual recording data no longer represents recorded visual content. This can be desirable to avoid unnecessarily occupying the digitization apparatus and/or to reduce the data storage capacity required for the digitized data. The identification of blank segment(s) by the invention can also be used to mark the end of recorded visual content in a set of visual recording data. This can be desirable to facilitate viewing a display generated from the visual recording data, to make processing of the visual recording data more efficient, and/or to reduce the data storage capacity required for the digitized data, by eliminating the need to interact with visual recording data that does not represent recorded visual content.

DETAILED DESCRIPTION OF THE INVENTION

Figure 1:
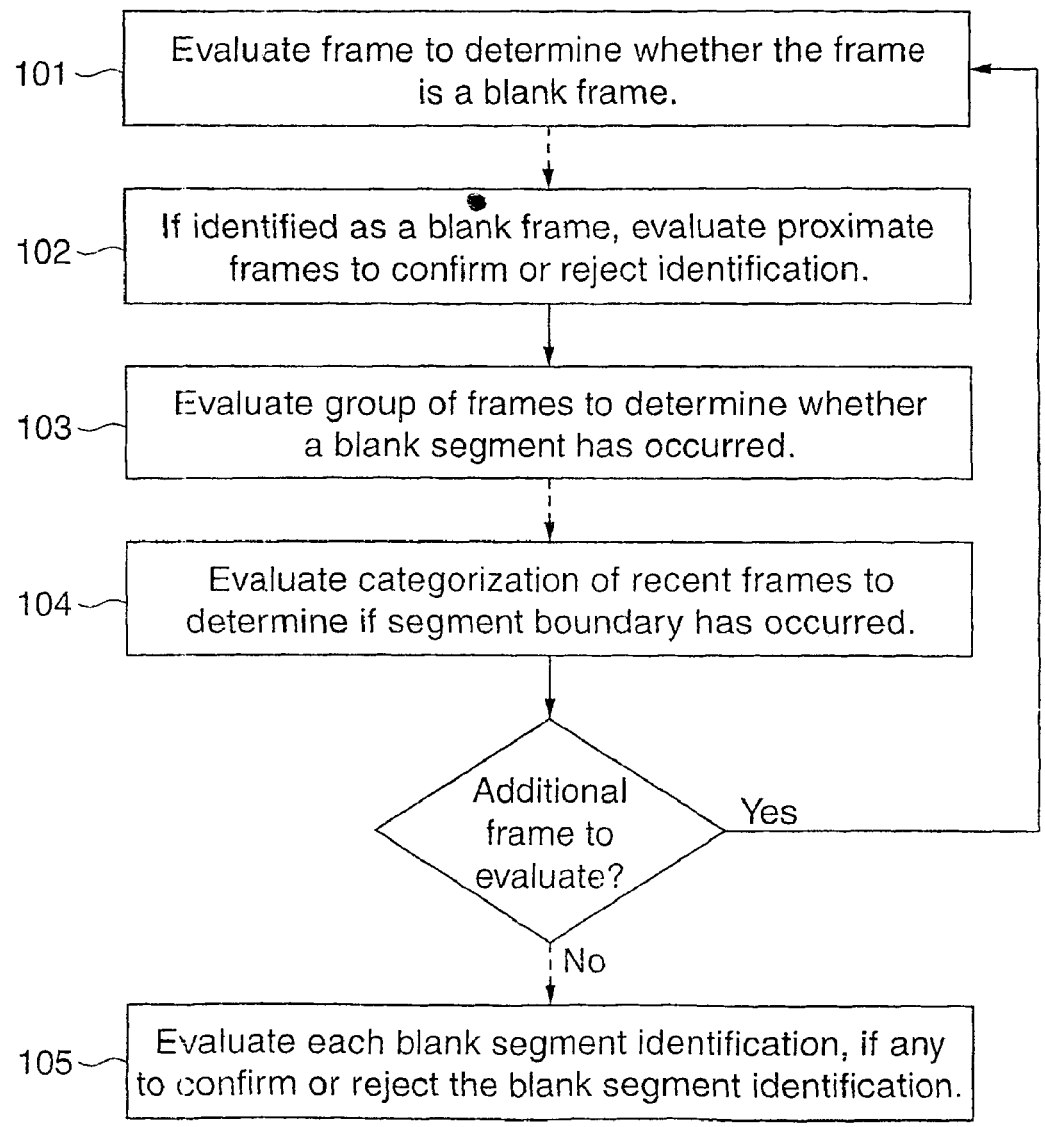
FIG. 1 is a flow chart of a method according to the invention for identifying one or more segments of a set of visual recording data that do not correspond to recorded visual content.

The invention enables identification of a segment of a set of visual recording data that does not correspond to recorded visual content (i.e., a segment that does not include a "valid" visual recording signal). Each such segment identified by the invention can be labelled (this can be desirable, for example, to facilitate interaction with the set of visual recording data, e.g., processing of, or generation of a display from, the set of visual recording data). For convenience, a segment of a set of visual recording data that does not correspond to recorded visual content is sometimes referred to herein as a "blank segment."

The identification of blank segment(s) by the invention can be useful for a variety of purposes. For example, blank segment(s) identified by the invention can be removed from the set of visual recording data (this can be useful, for example, to reduce the amount of data storage capacity used by the set of visual recording data). Blank segment(s) identified by the invention can also be "hidden" during interaction with the set of visual recording data, e.g., the blank segment(s) can be bypassed during generation of a display from the visual recording data, or the blank segment(s) can be bypassed during processing, such as filtering, of the visual recording data (this can be desirable to facilitate viewing a display generated from the visual recording data or to make processing of the visual recording data more efficient). The identification of blank segment(s) by the invention can also be used when converting analog visual recording data, such as video on a videotape, to digital visual recording data (i.e., during digitization) by monitoring the identification of blank segment(s) during digitization and stopping digitization when it is determined that the visual recording data no longer represents recorded visual content (this can be useful to avoid digitizing an unused section at the end of a videotape). The identification of blank segment(s) by the invention can also be used to mark the end of recorded visual content in a set of visual recording data (this can be desirable to facilitate viewing a display generated from the visual recording data, to make processing of the visual recording data more efficient, and/or to reduce the data storage capacity required for the digitized data, by eliminating the need to interact with visual recording data that does not represent recorded visual content). The identification of blank segment(s) by the invention can also be used to mark the beginning of recorded visual content in a set of visual recording data (this can be desirable when recording the set of visual recording data onto a data storage medium to inhibit recording until a first content segment—discussed below—has been identified).

The invention can be used to identify a blank segment in a set of visual recording data of any type that is obtained in any manner. For example, the invention can be used to identify a blank segment in a set of visual recording data obtained by a video camera or a motion picture camera. Additionally, the invention can be used to identify a blank segment in a set of analog or digital visual recording data; however, analog visual recording data must be converted to digital visual recording data (which can readily be accomplished using conventional methods and apparatus) prior to application of the invention. Further, the invention can be used to identify a blank segment in a set of visual recording data that represents a series of monochrome and/or color images.

As is well known, each frame (representing a single image) of digital visual recording data is commonly comprised of a multiplicity of numerical values that represent the color(s) in the image, one (for a monochrome image) or several (for a color image) numerical values representing the color at each location (pixel) in the image. Each numerical value can range from a predetermined lower limit (commonly 0) to a predetermined upper limit (e.g., 255, 65,535). Embodiments of the invention are described below with respect to a representation of each frame of visual recording data in which each pixel of the frame is comprised of red, green and blue color components (sometimes referred to as RGB) which can each range in value between 0 and 255. Those skilled in the art will readily understand how the embodiments of the invention described below can be modified for use with sets of visual recording data represented in other manners (e.g., monochrome images, other color gradation ranges, other color spaces such as YUV or CMYK).

FIG. 1 is a flow chart of a method 100 according to the invention for identifying one or more segments of a set of visual recording data that do not correspond to recorded visual content. The method 100 can advantageously be implemented so that the method 100 is performed in "real time," either as a set of visual recording data is acquired (i.e., as an imaging apparatus, such as a camera, is used to obtain frames of visual recording data) or as a set of visual recording data is being processed for another purpose (e.g., during playback or rewind of a videotape, as a set of analog visual recording data is digitized). Alternatively, the method 100 can be implemented so that the method 100 is performed in a "batch mode," i.e., by itself as separate processing of a set of previously acquired visual recording data. The method 100 is described below with a particular view to performance of the method 100 in "real time." However, the method 100 can also be implemented in the same or similar manner to be performed in "batch mode."

In step 101 of the method 100, individual frames of visual recording data are evaluated and a determination made as to whether the frame is a "blank frame" (i.e., a frame of visual recording data that does not correspond to recorded visual content). (Each frame of visual recording data is categorized as either a blank frame or a "content frame," i.e., a frame of visual recording data that does correspond to recorded visual content; blank frames can be further categorized according to the type of blank frame, as discussed further below.) In step 102 of the method 100, one or more evaluations of one or more frames of visual recording data proximate to an identified blank frame can be used to confirm the blank frame determination made in step 101. In step 103 of the method 100, blank segments of visual recording data are identified by grouping together proximate blank frames as those blank frames are determined. ("Content segments," i.e., sequences of frames of visual recording data that correspond to recorded visual content, are also implicitly identified; further, blank segments can also be categorized as to type, as discussed further below.) In step 104, a segment boundary is identified at the beginning of each group of frames of sufficient number that have a different categorization than that of the categorization of the most recently identified segment of frames. In step 105, the blank segment identifications are confirmed by evaluating all of the frames in each blank segment identified in step 103. Each of steps 102, 104 and 105 is optional (as indicated by the dashed lines entering the blocks representing the steps 102, 104 and 105 in FIG. 1) and need not necessarily be included as part of the method 100. Further, any one, any two or all three of the steps 102, 104 and 105 can be included as part of the method 100. Implementation of each of the steps of the method 100 is described in more detail below.

As indicated above, in step 101 of the method 100, blank frames are identified. Blank frames can have a variety of appearances. In general, the invention can be implemented to enable detection of a blank frame having any appearance. Below, four different blank frame detectors that can be used in embodiments of the invention are described, each blank frame detector adapted to detect blank frames having a particular appearance. However, the invention encompasses the use of blank frame detectors other than those described below. As can be understood by those skilled in the art, blank frame detectors other than those described below can be constructed in accordance with the principles and techniques, as evident from the description herein, used to construct the below-described blank frame detectors. Embodiments of the invention can be implemented so that multiple blank frame detectors (e.g., two, three or all four of the below-described blank frame detectors) are used to evaluate each frame of visual recording data to identify blank frames. Further, since blank frames can have a variety of appearances, embodiments of the invention can advantageously be implemented to enable detection of multiple types of blank frames. This can be done, for example, by using multiple blank frame detectors, each blank frame detector adapted to identify a particular type of blank frame. Implementation of the invention to enable detection of blank frames of multiple types is advantageous because different visual recording apparatus produce blank frames in different ways; it is anticipated that it will typically be the case that it is not known beforehand how blank frames are represented in a set of visual recording data to be processed in accordance with the invention. However, if the manner of representation of blank frames in the set of visual recording data is known, then the invention can be implemented using a particular type or types of blank frame detector that are particularly adapted to detect blank frames of the type that can be included in the set of visual recording data.

Blank frames often appear as a frame of visual recording data that represents an image that is all (or nearly all) one color. Thus, a blank frame detector that can be used with the invention can be adapted to detect frames of visual recording data that represent an image that is all (or nearly all) one color. Such a blank frame detector can be implemented, for example, as follows. The blank frame detector ascertains the numerical values for each color component of each pixel of a frame of visual recording data. A frame is identified as a blank frame if 1) for each color component, the numerical value of the color component for most of the pixels of the frame is very close to the average numerical value of the color component for all of the pixels of the frame, and 2) the average numerical value of each color component for all of the pixels of the frame is within a specified range and/or has a specified relationship with the average numerical value of one or more other color components for all of the pixels of the frame. For example, when the visual recording data is specified so that the numerical value of each color component of each pixel can vary between 0-255, a blank frame detector in accordance with the invention can be implemented so that the first condition above can be satisfied if, for each color component, greater than or equal to 80% of the pixels have a numerical value that is within 8 of the average value of that color component for all pixels of the frame. Satisfaction of the second condition above can depend on the particular color that the blank frame detector is intended to detect. Illustrative specifications of the second condition are described further below with respect to particular implementations of blank frame detectors in accordance with the invention.

For example, a blank frame sometimes appears as a frame of visual recording data that represents an image that is all (or nearly all) blue or purple. Some videocassette recorders (e.g., the Sony SLV1000) output blank frames of this type. Thus, one type of blank frame detector that can be used with the invention is adapted to detect frames of visual recording data that represent an image that is all (or nearly all) blue or purple. Such a frame is sometimes referred to herein as a "blue screen" and a blank frame detector that detects such frames is sometimes referred to herein as a "blue screen detector." When the visual recording data is specified so that the numerical value of each color component of each pixel can vary between 0-255, a blue screen detector for use with the invention can be implemented such that a frame of visual recording data is identified as a blue screen (i.e., a blank frame) if 1) for each color component, greater than or equal to 80% of the pixels have a numerical value that is within 8 of the average value of that color component for all pixels of the frame, and 2) the average numerical value of each color component for all of the pixels of the frame satisfies the following conditions: red<green<25, 60<blue<130, green-red<20, blue-green>50, and blue-red<85.

A blank frame also sometimes appears as a frame of visual recording data that represents an image that is all (or nearly all) silver. Some videocassette recorders (e.g., the Sony WV-DR7) output blank frames of this type. Thus, one type of blank frame detector that can be used with the invention is adapted to detect frames of visual recording data that represent an image that is all (or nearly all) silver. Such a frame is sometimes referred to herein as a "silver screen" and a blank frame detector that detects such frames is sometimes referred to herein as a "silver screen detector." When the visual recording data is specified so that the numerical value of each color component of each pixel can vary between 0-255, a silver screen detector for use with the invention can be implemented such that a frame of visual recording data is identified as a silver screen (i.e., a blank frame) if 1) for each color component, greater than or equal to 80% of the pixels have a numerical value that is within 8 of the average value of that color component for all pixels of the frame, and 2) the average numerical value of each color component for all of the pixels of the frame satisfies the following conditions: 60<red<130, 60<green<130, 60<blue<130, |green-red|<10, |green-blue|<10, and |red-blue|<10.

A blank frame also sometimes appears as a frame of visual recording data that represents an image that is all (or nearly all) black. Some videocassette recorders (e.g., the Sony SLV-550 during rewind) output blank frames of this type. Thus, one type of blank frame detector that can be used with the invention is adapted to detect frames of visual recording data that represent an image that is all (or nearly all) black. Such a frame is sometimes referred to herein as a "black screen" and a blank frame detector that detects such frames is sometimes referred to herein as a "black screen detector." When the visual recording data is specified so that the numerical value of each color component of each pixel can vary between 0-255, a black screen detector for use with the invention can be implemented such that a frame of visual recording data is identified as a black screen (i.e., a blank frame) if 1) for each color component, greater than or equal to 80% of the pixels have a numerical value that is within 8 of the average value of that color component for all pixels of the frame, and 2) the average numerical value of each color component for all of the pixels of the frame satisfies the following conditions: red<10, green<10, and blue<10.

A blank frame also sometimes appears as a frame of visual recording data that represents an image that is all (or nearly all) snow-static. Some videocassette recorders (e.g., the Sony SLV-550 during playback) output blank frames of this type. Thus, one type of blank frame detector that can be used with the invention is adapted to detect frames of visual recording data that represent an image that is all (or nearly all) snow-static. Such a frame is sometimes referred to herein as a "snow-static frame" and a blank frame detector that detects such frames is sometimes referred to herein as a "snow-static frame detector." When the visual recording data is specified so that the numerical value of each color component of each pixel can vary between 0-255, a snow-static detector for use with the invention can be implemented such that a frame of visual recording data is identified as a snow-static frame (i.e., a blank frame) if 1) the maximum variation from pure gray at each pixel is small (e.g., less than 15, such that if gray is defined as R=G=B, then, at each pixel, |green-red|<15, |green-blue|<15, and |red-blue|<15), 2) the average numerical value of each color component for all of the pixels of the frame satisfies the following conditions: 5<green<45, |green-red|<5, |green-blue|<5, and |red-blue|<5, and 3) the vertical and horizontal correlation coefficients are within a specified range and/or have a specified relationship with one another (e.g., $\varrho_{vert}$<0.41, $\varrho_{horiz}$<0.85, and 2$\varrho_{vert}$<$\varrho_{horiz}$).

As indicated above, the invention can be implemented so that multiple blank frame detectors are used to evaluate each frame of visual recording data. When multiple blank frame detectors are used, a frame can be labelled as more than one type of blank frame, e.g., a frame can be labeled as both a "snow-static frame" and "black screen" if it satisfies both sets of constraints. The use of multiple blank frame labels can be useful to facilitate detection of a blank segment in which the detection of blank frames may otherwise produce an ambiguous indication of the occurrence of a blank segment. For example, the use of multiple blank frame labels can be useful in the detection of snow-static blank segments, as explained further below.

As indicated above, in step 102 of the method 100, the blank frame determinations made in step 101 are further evaluated to either confirm or reject each blank frame determination. For a particular frame, this can be done by combining information from one or more neighboring frames with that frame. Blank frame determinations need not necessarily be confirmed for all blank frame detectors. In one embodiment of the invention, only identification of snow-static frames is confirmed. (In such an embodiment, any other blank frame determinations are automatically deemed confirmed.) Confirmation of snow-static frames can be implemented by, for example, evaluating the temporal correlation coefficient ($\varrho_{time}$), over a local window (i.e., a window including the frame to be evaluated for confirmation) of length $T_{Snow}$. For example, the invention can be implemented so that each frame within the window $T_{snow}$ is confirmed as a snow-static frame if all of the following conditions are satisfied within the window $T_{snow}$: 1) all of the frames in the window $T_{snow}$ were tentatively labeled as snow-static frames (in step 101), 2) at least one of the frames in the window $T_{snow}$ has a high temporal correlation coefficient with the immediately previous frame (e.g., $\varrho_{time}$ greater than about 0.98), and 3) at least one of the frames in the window $T_{snow}$ has a low temporal correlation coefficient (e.g., $\varrho_{time}$ less than about 0.02).

As indicated above, in step 103 of the method 100, blank frames are grouped together into blank segments as blank frames are determined. Identifying blank segments as the frames of visual recording data are being evaluated to identify blank frames can be desirable for at least two reasons. First, identifying blank segments "on-the-fly" enables an ongoing determination as to whether other processing of the visual recording data (e.g., digitization of analog visual recording data) should be terminated. For example, when the most recent blank segment becomes long enough (e.g., 2 minutes), indicating that no further visual recording content is represented by the remainder of the visual recording data, the other processing of the visual recording data can be terminated. Second, the identification of blank segments "on-the-fly" can be used to identify a segment boundary in the set of visual recording data when the segment categorization changes, as described in more detail below, which can result in the identification of segment boundaries that other processes or apparatus for identifying segment boundaries, such as an external cut detector (i.e., a process other than a process in accordance with the invention that identifies scene cuts in a set of visual recording data), may not identify. For example, an external cut detector may not identify a segment boundary between a black screen segment and snow-static segment, or perhaps more importantly, between a black screen segment and a content segment that includes a sequence of very dark images; the invention can identify such segment boundaries.

The determination of a blank segment as blank frames are determined is made by combining information for frames between (inclusive) a start frame of a segment and a tentative end frame of the segment. The start frame of a segment is the frame immediately following the end frame of a previous segment or, if there are no previous segments, the first frame of the visual recording data. The tentative end frame of the segment is the frame corresponding to a "current delay." The current delay can depend on the intended use of the blank segment determination made in accordance with the invention. For example, if the blank segment determination is to be used for deciding whether or not to stop digitization of the visual recording data, the current delay is the duration of time from the start frame to the current frame, so that the tentative end frame is the current frame. If, for example, the blank segment determination is to be used for identifying segment boundaries, it is desirable to use a delay that is at least as long as the maximum expected latency in declaring segment boundaries by other means. For example, a cut detector may have been used to previously identify segment boundaries in the set of visual recording data. If it is known that the maximum latency in declaring a segment boundary using the cut detector was 60 frames, it is desirable to evaluate a segment using the frame from the start of the segment up to the frame that is 60 frames before the current frame. This enables avoiding mistakenly mixing in the effects of a later segment into the current segment classification.

As indicated above, blank frames can have a variety of appearances. Thus, generally, the invention can be implemented to enable detection of blank segments including blank frames having any appearance. Below, four different blank segment detectors that can be used in embodiments of the invention are described. In general, each of the below-described blank segment detectors are adapted to detect blank segments including blank frames of one particular type. (One of the below-described blank segment detectors is adapted, in part, to detect blank segments including blank frames of multiple types.) However, the invention encompasses the use of blank segment detectors other than those described below. As can be understood by those skilled in the art, blank segment detectors other than those described below can be constructed in accordance with the principles and techniques, as evident from the description herein, used to construct the below-described blank segment detectors. Embodiments of the invention can be implemented so that multiple blank segment detectors (e.g., two, three or all four of the below-described blank segment detectors) are used to evaluate sequences of frames of visual recording data to identify blank segments. Further, since blank frames can have a variety of appearances, embodiments of the invention can advantageously be implemented to enable detection of blank segments including multiple types of blank frames. This can be done, for example, by using multiple blank segment detectors, each blank segment detector adapted to identify a blank segment including a particular type of blank frame.

A blank segment often includes a sequence of blank frames, all (or most) of which represent an image that is all (or nearly all) one color. Thus, a blank segment detector that can be used with the invention can be adapted to detect a sequence of frames of visual recording data, all or most of which represent an image that is all (or nearly all) one color (which is the same color as that of all or most of the images represented by other frames of the sequence). Such a blank segment detector can be implemented, for example, as follows. The blank segment detector evaluates a sequence of frames including a predetermined minimum number of frames (e.g., a sequence of at least 30 frames). A sequence of frames is identified as a blank segment if 1) there are enough frames in the sequence of frames that have been determined to be blank frames of the same color and 2) the blank frames of the same color in the sequence of frames are sufficiently similar in color to one another. For example, a blank segment detector in accordance with the invention can be implemented so that the first condition above is satisfied if a specified percentage (e.g., 95%) of the frames in the sequence are blank frames of the same color. Some visual recording apparatus produce frames at the beginning of a blank segment that do not correspond to visual recording content, but also do not conform to the appearance of other frames of the blank segment (e.g., some VCRs output several "rainbow-like" frames at the beginning of playing a videotape). To account for such visual recording apparatus, a blank segment detector in accordance with the invention can be implemented so that the first condition above is satisfied if the specified percentage of frames is assessed after eliminating a specified number of frames (e.g., 6) at the beginning of the sequence of frames. A blank segment detector in accordance with invention can be implemented so that, when the visual recording data is specified so that the numerical value of each color component of each pixel can vary between 0-255, the second condition above can be satisfied if the variance of the average (over an entire frame) of each color component for the frames identified as blank frames of the same color is less than 10.

For example, as discussed above, blank frames sometimes appear as a frame of visual recording data that represents an image that is all (or nearly all) blue or purple, a frame of visual recording data that represents an image that is all (or nearly all) silver, or a frame of visual recording data that represents an image that is all (or nearly all) black. Thus, three types of blank segment detectors that can be used with the invention are adapted to detect blank segments that include frames of visual recording data that represent an image that is all (or nearly all) blue or purple, silver or black, respectively. Such blank segment detectors are sometimes referred to herein as a "blue screen segment detector," "silver screen segment detector," and "black screen segment detector," respectively. Such blank segment detectors can be implemented so that the blank segment detector evaluates a sequence of frames including a predetermined minimum number of frames (e.g., a sequence of at least 30 frames) and identifies a sequence of frames as a blank segment if the first and second conditions described above are met with respect to the color of blank frames that can be detected by that blank segment detector.

As discussed above, blank frames also sometimes appear as a frame of visual recording data that represents an image that is all (or nearly all) snow-static. Thus, one type of blank segment detector that can be used with the invention is adapted to detect blank segments that include frames of visual recording data that represent an image that is all (or nearly all) snow-static. Such a blank segment detector is sometimes referred to herein as a "snow-static segment detector." Such a blank segment detector can be implemented so that the blank segment detector evaluates a sequence of frames including a predetermined minimum number of frames (e.g., a sequence of at least 30 frames) and identifies a sequence of frames as a blank segment if the first condition described above is met with respect to the snow-static frames.

However, often, snow-static frames are dark enough that snow-static frames are not separated from black screen frames by external cut detectors. It is desirable to identify blank segments that include both snow-static and black screen frames. Therefore, a snow-static segment detector in accordance with the invention can be implemented so that a sequence of frames is identified as a blank segment if 1) a specified minimum number of frames in the sequence of frames have been identified as snow-static frames, 2) there are enough frames in the sequence of frames that have been identified either as black screen frames, or identified and confirmed as snow-static frames, and 3) the black screen frames in the sequence of frames are sufficiently similar in color to one another. For example, a blank segment detector in accordance with the invention can be implemented so that the first condition in the immediately preceding sentence can be satisfied if at least 5 snow-static frames have been identified in the sequence of frames. A blank segment detector in accordance with invention can be implemented so that the second condition in the immediately preceding sentence is satisfied if a specified percentage (e.g., 95%) of the frames in the sequence have been identified as black screen frames and/or confirmed snow-static frames (The blank segment detector can, if appropriate, be further implemented as described above to account for visual recording apparatus that produce frames at the beginning of a blank segment that neither correspond to visual recording content or conform to the appearance of other frames of the blank segment). A blank segment detector in accordance with invention can be implemented so that, when the visual recording data is specified so that the numerical value of each color component of each pixel can vary between 0 255, the third condition in the immediately preceding sentence can be satisfied if the variance of the average (over an entire frame) of each color component for the frames identified as black screen frames is less than 10. If, in a blank segment detector that makes use of the three above-described conditions, the condition(s) are satisfied, then the segment is identified as a snow-static blank segment.

As indicated above, the invention can be implemented so that multiple blank segment detectors are used to evaluate a sequence of frames of visual recording data. When multiple blank segment detectors are used, a segment can be labelled as more than one type of blank segment, e.g., a segment can be labeled as both a "snow-static blank segment" and "black screen segment" if the segment satisfies both sets of constraints. This can be useful, for example, in allowing a segment to be treated both as a blank segment and as a potential center to a scene fade.

Once a sequence of frames has been evaluated to determine whether the sequence of frames is a blank segment, each subsequent frame of visual recording data is evaluated to determine whether the frame is part of the existing segment (which can be a blank segment or a content segment) or the beginning of a new segment (which, when the existing segment is a content segment, is a blank segment, or, when the existing segment is a blank segment, is a content segment or a new type of blank segment). In one embodiment of the invention, a determination is made as to whether the categorization of the new frame is the same as that of the current segment: if it is, the new frame is grouped together with the frames of the current segment; if it is not, the new frame is denoted as the beginning of a new segment. According to another embodiment of the invention, the new frame is included as part of the sequence of frames comprising the current segment, producing a modified current segment, and the modified current segment is evaluated by one or more blank segment detectors, as described above. Though, use of the latter embodiment constitutes a more rigorous evaluation of whether the new frame should be part of the current segment or not, use of the former embodiment can be acceptable. This is particularly so whenever one or both of the following conditions are true: 1) the constraints used by the blank frame detector(s) are tight enough that, in practice, any variance constraint of the blank segment detector(s) seldom affects the blank segment determination for a modified current segment (this has been found to be generally true for the specific implementations of blue, silver, black and snow-static frame detectors discussed above), and (2) the penalty for mistakenly allowing a segment to continue without identifying a change in segment type is not heavy enough (e.g., such mistakes occur sufficiently rarely for the application for which the invention is used) to warrant the additional computational load associated with performing the calculations of the blank segment detector (e.g., checking the updated variance measure) for the modified current segment. This can also be so, for example, when "real-time" operation of the invention (e.g., use of the invention to control termination of a digitization process) would be unacceptably degraded by performing the calculations of the blank segment detector.

Often, segment boundaries for a set of visual recording data have already been provided at the time that the invention is used to identify blank segments. For example, shot detection can be used to identify segment boundaries in a set of visual recording data by, for example, detecting cuts and fades, and marking the detected cuts and fades as segment boundaries. Typically, it is desirable to maintain segment boundaries that have already been identified in the set of visual recording data. However, these segment boundaries will sometimes not include a location in the set of visual recording data at which the segment categorization changes (i.e., a location which should be designated as a segment boundary). This may be due to a comparatively subtle change in the images generated from successive frames (e.g., a change from a dark "snow-static" segment to a "black screen" segment). This may also be due to constraints on the proximity of segment boundaries to one another that were imposed by a process that produced the segment boundaries. For example, a process for producing segment boundaries may impose a constraint that prohibits segment boundaries from being closer than 30 apart. Such a process cannot identify both segment boundaries for a 15 frame shot. If, for example, the beginning of the 15 frame shot is marked as a segment boundary, the end of that segment will include at least 15 frames in addition to those of the 15 frame shot. If, for instance, the additional frames represent a blue screen segment, the entire segment may be identified as a blank segment and the visual content of the 15 frame shot may be lost.

Thus, as indicated above, in step 104 of the method 100, the categorization of frames of visual recording data produced by the invention can be used to identify segment boundaries in the set of visual recording data. In particular, a group of the most recently categorized frames can be evaluated and the categorization of frames in that group compared to the categorization of the current segment. If a specified number (e.g., 6) of the frames in a group (e.g., 10) of the most recently categorized frames have a categorization that is different from the categorization of the current segment, then a segment boundary is identified at the beginning of the group of frames (since the change in categorization indicates that a new segment has begun). In the example discussed above, in which a 15 frame shot was incorrectly grouped together in a single segment with a subsequent blue screen segment, the invention can correctly identify the 15 frame shot and the blue screen segment as separate segments. Using a blank segment detector in accordance with the invention, as discussed above, which identifies segments by evaluating a sequence of at least 30 frames, the first 30 would be identified as a content segment (since the effect of the 15 frames of content would outweigh the effect of the 15 blue screen frames in determining whether the 30 were a blank segment or content segment) and subsequent blue screen frames would be identified as a blue screen segment.

In some situations it is desirable to retain the detected segment boundary as part of the visual recording data; in others it is not. In the example discussed above, in which a 15 frame shot was incorrectly grouped together in a single segment with a blue screen segment, if the 15 frame shot would otherwise be omitted from the visual recording data, then it typically is preferable to retain the segment boundary identified by the invention, in order to ensure that no recorded visual content is discarded. However, it can be undesirable to retain a segment boundary detected by the invention if that segment boundary is too close to an existing segment boundary. Therefore, this aspect of the invention can be further implemented to check for existing segment boundaries within a specified number of frames (e.g., 30) of a new segment boundary identified by the invention; if there are no such existing segment boundaries, then the new segment boundary is retained as part of the visual recording data. Alternatively, this aspect of the invention can be implemented so that a new segment boundary identified by the invention is always retained and existing segment boundaries are adjusted as necessary using another process for analyzing the occurrence of segment boundaries.

As discussed above, in step 105 of the method 100, the blank segment identifications are confirmed by evaluating all of the frames in each blank segment identified in step 103. As indicated above, step 105 is optional: if, for example, computational constraints are tight, or for some other reason it is not possible to change the initial blank segment identifications, then the blank segment identifications of step 103 can be used. The blank segment identifications can be confirmed by re-evaluating the initial blank segment identifications in a manner similar to that used to produce the initial blank segment identifications. In one implementation of the step 105, the above-described blank segment detectors used in step 103 can be used to re-evaluate the initial blank segment identifications, the blank segment detectors being modified to eliminate a specified number (e.g., 6) of the last frames of the blank segment prior to evaluating the conditions for determining whether the segment is a blank segment. (This is done for the same reason as described above for the omission of a specified number of blank frames at the beginning of a segment during the blank segment identification of step 103, i.e., some visual recording apparatus produce frames at the beginning of a blank segment that neither correspond to visual recording content or conform to the appearance of other frames of the blank segment.)

As discussed above, the identification of blank segment(s) by the invention can be useful for a variety of purposes. As also discussed above, the identification of blank segment(s) by the invention can be useful during digitization of a videotape (or other analog medium on which visual recording data is stored). In particular, the occurrence of a long blank segment indicates that no further recorded visual content is present on the videotape and that the digitization process can be terminated. Thus, the invention can advantageously be implemented together with a digitization process so that detection of blank segments in a set of visual recording data occurs as each frame of analog visual recording data is digitized. Information regarding blank segment identification can be communicated to the digitization process, so that the duration of a currently detected blank segment can be monitored and the digitization process terminated when the currently detected blank segment is greater than or equal to a specified duration of time (e.g., 2 minutes). It can be desirable for such communication to occur under control of the digitization process so that the digitization process can allocate resources for such communication at time(s) that are most convenient for the digitization process; however, this is not necessary.

Generally, the invention (e.g., a blank frame detector and/or a blank segment detector in accordance with the invention) can be implemented in any apparatus (or as part of any apparatus), as any method (or part of a method), or as any computer program or computer programs (or part of a computer program or computer programs), which can be encoded on a computer readable medium or media, that produces the functionality of the invention as described herein. In particular, as can be readily appreciated, the invention (e.g., a blank frame detector and/or a blank segment detector in accordance with the invention) can be implemented in any computational device (which can be part of a larger apparatus or system) that is programmed (using software and/or firmware) to produce the functionality of the invention as described herein.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. Apparatus for identifying a blank segment in a set of visual recording data, comprising:
   a blank frame detector, the blank frame detector adapted to evaluate a frame of visual recording data to determine whether the frame of visual recording data is a snow-static frame, wherein the blank frame detector is adapted to:
      determine if a specified maximum variation from pure gray at each pixel is less than a specified magnitude;
      determine if the average numerical value of each color component for all of the pixels of the frame is within a specified range and/or has a specified relationship with the average numerical value of one or more other color components; and
      determine if the vertical and horizontal correlation coefficients are within corresponding specified ranges and/or have a specified relationship with one another, wherein:
         if the specified maximum variation from pure gray at each pixel is less than a specified magnitude, the average numerical value of each color component for all of the pixels of the frame is within a specified range and/or has a specified relationship with the average numerical value of one or more other color components, and the vertical and horizontal correlation coefficients are within corresponding specified ranges and/or have a specified relationship with one another, then the frame is a snow-static frame; and
   a blank segment detector, the blank segment detector adapted to receive input from the blank frame detector regarding a plurality of frames of visual recording data and to evaluate a characteristic of the plurality of frames of visual recording data to determine whether the plurality of frames of visual recording data is a blank segment that does not correspond to recorded visual content.

2. Apparatus as in claim 1, set of further comprising:
   a plurality of blank frame detectors, each blank frame detector adapted to evaluate a frame of visual recording data to determine whether the frame of visual recording data is a blank frame; and wherein:
   the blank segment detector is adapted to receive input from the plurality of blank frame detectors regarding a plurality of frames of visual recording data and to evaluate a characteristic of the plurality of frames of visual recording data to determine whether the plurality of frames of visual recording data is a blank segment that does not correspond to recorded visual content.

3. Apparatus as in claim 2, wherein:
   the plurality of blank frame detectors comprise first and second blank frame detectors;
   the first blank frame detector is adapted to evaluate a frame of visual recording data to determine whether the frame of visual recording data is a blank frame of a first type; and
   the second blank frame detector is adapted to evaluate a frame of visual recording data to determine whether the frame of visual recording data is a blank frame of a second type, the second type being different from the first type.

4. Apparatus as in claim 2, wherein at least one of the plurality of blank frame detectors is adapted to detect frames of visual recording data that represent an image that is all or nearly all one color.

5. Apparatus as in claim 4, wherein
   the blank segment detector is adapted to evaluate a characteristic of the plurality of frames of visual recording data to determine whether the plurality of frames of visual recording data is a blank segment that is all or nearly all one color.

6. Apparatus as in claim 5, wherein the blank segment detector is adapted to determine if there are a specified number of frames in a sequence of frames that have been determined to be blank frames of the same color, wherein if there are a specified number of frames in the sequence of frames that have been determined to be blank frames of the same color, then the segment is a blank segment.

7. Apparatus as in claim 6, wherein the specified number of frames is 95% of the frames in the sequence of frames after the first 6 frames in the sequence of frames.

8. Apparatus as in claim 6, wherein the blank segment detector is adapted to determine if the blank frames of the same color in the sequence of frames differ in color by no more than a specified amount, wherein if there are a specified number of frames in the sequence of frames that have been determined to be blank frames of the same color and the blank frames of the same color in the sequence of frames differ in color by no more than a specified amount, then the segment is a blank segment.

9. Apparatus as in claim 8, wherein the specified amount is a variance of the average color of the frames of the same color of less than 10.

10. Apparatus as in claim 1, further comprising:
    a plurality of blank frame detectors, each blank frame detector adapted to evaluate a frame of visual recording data to determine whether the frame of visual recording data is a blank frame, at least one of the plurality of blank frame detectors adapted to determine, if a frame is determined to be a blank frame, whether the blank frame of a first type or of a second type that is different from the first type; and wherein:
    the blank segment detector is adapted to receive input from the plurality of blank frame detectors regarding a plurality of frames of visual recording data and to evaluate a characteristic of the plurality of frames of visual recording data to determine whether the plurality of frames of visual recording data is a blank segment that does not correspond to recorded visual content.

11. Apparatus as in claim 1, wherein:
    each pixel of the frame of visual recording data is represented by a red color component, a green color component and a blue color component, each color component having a value between 0 and 255 inclusive;
    the maximum variation from pure gray of each color component at each pixel is less than 15;
    the specified range for the green color component is between 5 and 45;
    the absolute value of the difference between the magnitude of the red color component and the magnitude of the green color component is less than 5;

the absolute value of the difference between the magnitude of the green color component and the magnitude of the blue color component is less than 5; and the absolute value of the difference between the magnitude of the red color component and the magnitude of the blue color component is less than 5;

the vertical correlation coefficient is less than 0.41;

the horizontal correlation coefficient is less than 0.85; and the horizontal correlation coefficient is greater than twice the vertical correlation coefficient.

12. Apparatus as in claim 1, further comprising a plurality of blank segment detectors, each blank segment detector adapted to receive input from a blank frame detector regarding a plurality of frames of visual recording data and to evaluate a characteristic of the plurality of frames of visual recording data to determine whether the plurality of frames of visual recording data is a blank segment that does not correspond to recorded visual content.

13. Apparatus as in claim 12, wherein:

the plurality of blank segment detectors comprise first and second blank segment detectors;

the first blank segment detector is adapted to detect blank segments including blank frames of a first type; and the second blank segment detector is adapted to detect blank segments including blank frames of a second type, the second type being different from the first type.

14. Apparatus as in claim 1, wherein the blank segment detector is adapted to evaluate a characteristic of the plurality of frames of visual recording data to determine whether the plurality of frames of visual recording data is a blank segment that includes one or more blank frames of a first type and one or more blank frames of a second type that is different from the first type.

15. Apparatus as in claim 14, wherein the blank segment detector is adapted to detect a first type of blank segment including blank frames of a first type, or a second type of blank segment including blank frames of a second type that is different from the first type of blank frames.

16. Apparatus as in claim 1, wherein a blank the blank segment detector is adapted to evaluate a characteristic of the plurality of frames of visual recording data to determine whether the plurality of frames of visual recording data is a blank segment that is all or nearly all snow-static.

17. Apparatus as in claim 16, wherein the blank segment detector is adapted to determine if there are a specified number of frames in a sequence of frames that have been determined to be snow-static frames, wherein if there are a specified number of frames in the sequence of frames that have been determined to be snow-static frames, then the segment is a blank segment.

18. Apparatus as in claim 17, wherein the specified number of frames is 95% of the frames in the sequence of frames after the first 6 frames in the sequence of frames.

19. Apparatus as in claim 17, wherein:

the blank frame detector is adapted to evaluate a frame of visual recording data to determine whether the frame of visual recording data is a black frame; and the blank segment detector is adapted to:

determine if a specified number of frames in the sequence of frames have been identified either as black screen frames or snow-static frames;

determine if the black screen frames in the sequence of frames differ in color by no more than a specified amount, wherein:

if there are a specified number of frames in a sequence of frames that have been determined to be snow-static frames, a specified number of frames in the sequence of frames have been identified either as black screen frames or snow-static frames, and the black screen frames in the sequence of frames differ in color by no more than a specified amount, then the segment is a blank segment.

20. Apparatus as in claim 19, wherein:

the specified number of snow-static frames in the sequence of frames is 5;

the specified number of frames is 95% of the frames in the sequence of frames after the first 6 frames of the sequence of frames; and the specified amount is a variance of the average color of the black frames of less than 10.

21. Apparatus as in claim 1, wherein:

the blank frame and blank segment determinations are made for successive frames of visual recording data as the frames of visual recording data are acquired or as the frames of visual recording data are being processed for another purpose.

22. Apparatus as in claim 21, adapted to communicate a categorization of a current segment to another process operating on the set of visual recording data.

23. Apparatus as in claim 22, wherein the set of visual recording data is initially in an analog form and the other process is a digitization process.

24. Apparatus as in claim 23, wherein:

the current segment categorization comprises communicating the duration of a current blank segment; and the digitization process can be terminated if the duration of the current blank segment exceeds a specified duration.

25. Apparatus as in claim 23, further comprising a second blank frame detector adapted to evaluate a frame of visual recording data to determine whether the frame is a blank frame of a first type or a blank frame of a second type that is different from the first type.

26. Apparatus as in claim 23, wherein the blank segment detector is adapted to receive input from the plurality of blank frame detectors regarding a plurality of frames of visual recording data and to evaluate a characteristic of that plurality of frames of visual recording data to determine whether that plurality of frames of visual recording data is a blank segment that does not correspond to recorded visual content and to determine, if the plurality of frames of visual recording data is determined to be a blank segment, whether the blank segment includes one or more blank frames of a first type and one or more blank frames of a second type that is different from the first type.

27. Apparatus as in claim 22, wherein the communication of a current segment categorization further comprises:

identifying the beginning of a first content segment in the set of visual recording data; and communicating the identification of the beginning of the first content segment to the other process operating on the set of visual recording data.

28. Apparatus as in claim 27, wherein:

the other process is a process for recording the set of visual recording data onto a data storage medium; and visual recording data is not recorded onto the data storage medium until the identification of the beginning of the first content segment is communicated to the recording process.

29. Apparatus as in claim 1, adapted to use the detection of one or more blank segments to identify one or more segment boundaries in the set of visual recording data, each segment boundary delineating a transition from a segment of one type to a segment of another type.

30. Apparatus as in claim 29, adapted to:
identify a segment boundary at the beginning of a blank segment; and
mark the identified segment boundary to cause the blank segment following the identified segment boundary to be excluded from subsequent interaction with the set of visual recording data.

31. Apparatus as in claim 30, wherein the set of visual recording data is used to generate a display of the corresponding recorded visual content, a display of the recorded visual content corresponding to the marked segment not being generated.

32. Apparatus as in claim 30, wherein the set of visual recording data is processed in a specified manner, the visual recording data in the marked segment not being processed.

33. Apparatus as in claim 29, adapted to:
identify a segment boundary at the beginning of a blank segment; and
delete the visual recording data in the blank segment from the set of visual recording data.

34. Apparatus as in claim 29, adapted to:
determine the duration of a blank segment; and
identify the end of recorded visual content in the set of visual recording data as the beginning of a blank segment having greater than a specified duration.

35. Apparatus as in claim 1, wherein the blank frame detector is further adapted to evaluate, when a frame is determined to be a snow-static frame, the temporal correlation coefficient over a specified window of frames of visual recording data that includes the snow-static frame to either confirm or reject the determination that the frame is a snow-static frame.

36. Apparatus for identifying a blank segment in a set of visual recording data, comprising;
a blank frame detector, the blank frame detector adapted to evaluate a frame of visual recording data to determine whether the frame of visual recording data is a blank frame representing an image that is all or nearly all one color, wherein the blank frame detector is adapted to:
determine if, for each color component, the numerical value of a specified number of the pixels of the frame is within a specified magnitude of the average numerical value of that color component for all of the pixels of the frame; and
determine if the average numerical value of each color component for all of the pixels of the frame is within a specified range and/or has a specified relationship with the average numerical value of one or more other color components, wherein:
if, for each color component, the numerical value of the specified number of the pixels of the frame is within the specified magnitude of the average numerical value of that color component for all of the pixels of the frame, and if the average numerical value of each color component for all of the pixels of the frame is within a specified range and/or has a specified relationship with the average numerical value of one or more other color components, then the frame is a blank frame;
the numerical value of each color component of each pixel can vary between 0 and 255 inclusive;
the specified number of pixels is greater than or equal to 80% of the pixels; and
the specified magnitude is 8; and a blank segment detector, the blank segment detector adapted to receive input from the blank frame detector regarding a plurality of frames of visual recording data and to evaluate a characteristic of the plurality of frames of visual recording data to determine whether the plurality of frames of visual recording data is a blank segment that does not correspond to recorded visual content.

37. Apparatus as in claim 36, wherein the blank frame detector is adapted to detect frames of visual recording data that represent an image that is all or nearly all blue or purple.

38. Apparatus as in claim 37, wherein:
each pixel of the frame of visual recording data is represented by a red color component, a green color component and a blue color component, each color component having a value between 0 arid 255 inclusive;
the specified range for the red color component is less than 25;
the specified range for the green color component is less than 25;
the specified range for the blue color component is between 60 and 130;
the magnitude of the red color component subtracted from the green color component is less than 20;
the magnitude of the green color component subtracted from the blue color component is less than 50; and
the magnitude of the red color component subtracted from the blue color component, is less than 85.

39. Apparatus as in claim 36, wherein the blank frame detector is adapted to detect frames of visual recording data that represent an image that is all or nearly all silver.

40. Apparatus as in claim 39, wherein
each pixel of the frame of visual recording data is represented by a red color component, a green color component and a blue color component, each color component having a value between 0 and 255 inclusive;
the specified range for the red color component is between 60 and 130;
the specified range for the green color component is between 60 and 130;
the specified range for the blue color component is between 60 and 130;
the absolute value of the difference between the magnitude of the red color component and the magnitude of the green color component is less than 10;
the absolute value of the difference between the magnitude of the green color component and the magnitude of the blue color component is less than 10; and
the absolute value of the difference between the magnitude of the red color component and the magnitude of the blue color component is less than 10.

41. Apparatus as in claim 36, wherein the blank frame detector is adapted to detect frames of visual recording data that represent an image that is all or nearly all black.

42. Apparatus as in claim 41, wherein:
each pixel of the frame of visual recording data is represented by a red color component, a green color component and a blue color component, each color component having a value between 0 and 255 inclusive;
the specified range for the red color component is less than 10;
the specified range for the green color component is less than 10; and
the specified range for the blue color component is less than 10.

43. Apparatus as in claim 36, wherein:
the blank frame and blank segment determinations are made for successive frames of visual recording data as the frames of visual recording data are acquired or as the frames of visual recording data are being processed for another purpose;
the set of visual recording data is initially in an analog form;
the apparatus is adapted to communicate a categorization of a current segment to a digitization process;
the current segment categorization comprises the duration of a current blank segment; and
the digitization, process can be terminated if the duration of the current blank segment exceeds a specified duration.

44. Apparatus for identifying a blank segment in a set of visual recording data, comprising:
a blank frame detector, the blank frame detector adapted to evaluate a frame of visual recording data to determine whether the frame of visual recording data is a snow-static frame;
a blank segment detector, the blank segment detector adapted to receive input from the blank frame detector regarding a plurality of frames of visual recording data and to evaluate a characteristic of the plurality of frames of visual recording data to determine whether the plurality of frames of visual recording data is a blank segment that does not correspond to recorded visual content; and wherein:
the blank frame detector is further adapted to evaluate, when a frame is determined to be a snow-static frame, the temporal correlation coefficient over a specified window of frames of visual recording data that includes the snow static frame to either confirm or reject the determination that the frame is a snow-static frame.

45. Apparatus as in claim 44, wherein the evaluation of the temporal correlation coefficient further comprises:
determining if all of the frames in the window are snow-static frames;
determining if at least one of the frames in the window has a temporal correlation coefficient with greater than a first specified magnitude; and
determining if at least one of the frames in the window has a temporal correlation coefficient with less than a second specified magnitude.

46. Apparatus as in claim 45, wherein:
the first specified magnitude is 0.98; and
the second specified magnitude is 0.02.

47. Apparatus as in claim 44, further comprising;
a plurality of blank frame detectors, each blank frame detector adapted to evaluate a frame of visual recording data to determine whether the frame of visual recording data is a blank frame; and wherein:
the blank segment detector is adapted to receive input from the plurality of blank frame detectors regarding a plurality of frames of visual recording data and to evaluate a characteristic of the plurality of frames of visual recording data to determine whether the plurality of frames of visual recording data is a blank segment that does not correspond to recorded visual content.

48. Apparatus as in claim 47, wherein:
the plurality of blank frame detectors comprise first and second blank frame detectors;
the first blank frame detector is adapted to evaluate a frame of visual recording data to determine whether the frame of visual recording data is a blank frame of a first type; and the second blank frame detector is adapted to evaluate a frame of visual recording data to determine whether the frame of visual recording data is a blank frame of a second type, the second type being different from the first type.

49. Apparatus as in claim 47, wherein at least one of the plurality of blank frame detectors is adapted to detect frames of visual recording data that represent an image that is all or nearly all one color.

50. Apparatus as in claim 49, wherein the blank segment detector is adapted to evaluate a characteristic of the plurality of frames of visual recording data to determine whether the plurality of frames of visual recording data is a blank segment that is all or nearly all one color.

51. Apparatus as in claim 50, wherein the blank segment detector is adapted to determine if there are a specified number of frames in a sequence of frames that have been determined to be blank frames of the same color, wherein it there are a specified number of frames in the sequence of frames that have been determined to be blank frames of the same color, then the segment is a blank segment.

52. Apparatus as in claim 51, wherein the specified number of frames is 95% of the frames in the sequence of frames after the first 6 frames in the sequence of frames.

53. Apparatus as in claim 51, wherein the blank segment detector is adapted to determine if the blank frames of the same color in the sequence of frames differ in color by no more than a specified amount, wherein if there are a specified number of frames in the sequence of frames that have been determined to be blank frames of the same color and the blank frames of the same color in the sequence of frames differ in color by no more than a specified amount, then the segment is a blank segment.

54. Apparatus as in claim 53, wherein the specified amount is a variance of the average color of the frames of the same color of less than 10.

55. Apparatus as in claim 44, further comprising:
a plurality of blank frame detectors, each blank frame detector adapted to evaluate a frame of visual recording data to determine whether the frame of visual recording data is a blank frame, at least one of the plurality of blank frame detectors adapted to determine, if a frame is determined to be a blank frame, whether the blank frame is of a first type or of a second type that is different from the first type; and wherein:
the blank segment detector is adapted to receive input from the plurality of blank frame detectors regarding a plurality of frames of visual recording data and to evaluate a characteristic of the plurality of frames of visual recording data to determine whether the plurality of frames of visual recording data is a blank segment that does not correspond to recorded visual content.

56. Apparatus as in claim 44, further comprising a plurality of blank segment detectors, each blank segment detector adapted to receive input from a blank frame detector regarding a plurality of frames of visual recording data and to evaluate a characteristic of the plurality of frames of visual recording data to determine whether the plurality of frames of visual recording data is a blank segment that does not correspond to recorded visual content.

57. Apparatus as in claim 56, wherein:
the plurality of blank segment detectors comprise first and second blank segment detectors;
the first blank segment detector is adapted to detect blank segments including blank frames of a first type; and the second blank segment detector is adapted to detect blank segments including blank frames of a second type, the second type being different from the first type.

58. Apparatus as in claim 44, wherein the blank segment detector is adapted to evaluate a characteristic of the plurality of frames of visual recording data to determine whether the plurality of frames of visual recording data is a blank segment that includes one or more blank frames of a first type and one or more blank frames of a second type that is different from the first type.

59. Apparatus as in claim 58, wherein the blank segment detector is adapted to detect a first type of blank segment including blank frames of a first type, or a second type or blank segment including blank frames of a second type that is different from the first type of blank frames.

60. Apparatus as in claim 44, wherein the blank segment detector is adapted to evaluate a characteristic of the plurality of frames of visual recording data to determine whether the plurality of frames of visual recording data is a blank segment that is all or nearly all snow-static.

61. Apparatus as in claim 60, wherein the blank segment detector is adapted to determine if there are a specified number of frames in a sequence of frames that have been determined to be snow-static frames, wherein if there are a specified number of frames in the sequence of frames that have been determined to be snow-static frames, then the segment is a blank segment.

62. Apparatus as in claim 61, wherein the specified number of frames is 95% of the frames in the sequence of frames after the first 6 frames in the sequence of frames.

63. Apparatus as in claim 61, wherein:
the blank frame detector is adapted to evaluate a frame of visual recording data to determine whether the frame of visual recording data is a black frame; and
the blank segment detector is adapted to:
determine if a specified number of frames in the sequence of frames have been identified either as black screen frames or snow-static frames;
determine if the black screen frames in the sequence of frames differ in color by no more than a specified amount, wherein:
if there are a specified number of frames in a sequence of frames that have been determined to be snow-static frames, a specified number of frames in the sequence of frames have been identified either as black screen frames or snow-static frames, and the black screen frames in the sequence of frames differ in color by no more than a specified amount, then the segment is a blank segment.

64. Apparatus as in claim 63, wherein:
the specified number of snow-static frames in the sequence of frames is 5;
the specified number of frames is 95% of the frames in the sequence of frames after the first 6 frames of the sequence of frames; and
the specified amount is a variance of the average color of the black frames of less than 10.

65. Apparatus as in claim 44, wherein the blank frame and blank segment determinations are made for successive frames of visual recording data as the frames of visual recording data are acquired or as the frames of visual recording data are being processed for another purpose.

66. Apparatus as in claim 65, adapted to communicate a categorization of a current segment to another process operating on the set of visual recording data.

67. Apparatus as in claim 66, wherein the set of visual recording data is initially in an analog form and the other process is a digitization process.

68. Apparatus as in claim 67, wherein:
the current segment categorization comprises the duration of a current blank segment; and
the digitization process can he terminated if the duration of the current blank segment exceeds a specified duration.

69. Apparatus as in claim 67, further comprising a second blank frame detector adapted to evaluate a frame of visual recording data to determine whether the frame is a blank frame of a first type or a blank frame of a second type that is different from the first type.

70. Apparatus as in claim 67, wherein the blank segment detector is adapted to receive input from the plurality of blank frame detectors regarding a plurality of frames of visual recording data and to evaluate a characteristic of that plurality of frames of visual recording data to determine whether that plurality of frames of visual recording data is a blank segment that does not correspond to recorded visual content and to determine, if the plurality of frames of visual recording data is determined to be a blank segment, whether the blank segment includes one or more blank frames of a first type and one or more blank frames of a second type that is different from the first type.

71. Apparatus as in claim 66, wherein the communication of a current segment categorization further comprises:
identifying the beginning of a first content segment in the set of visual recording data; and
communicating the identification of the beginning of the first content segment to the other process operating on the set of visual recording data.

72. Apparatus as in claim 71, wherein:
the other process is a process for recording the set of visual recording data onto a data storage medium; and
visual recording data is not recorded onto the data storage medium until the identification of the beginning of the first content segment is communicated to the recording process.

73. Apparatus as in claim 44, adapted to use the detection of one or more blank segments to identify one or more segment boundaries in the set of visual recording data, each segment boundary delineating a transition front a segment of one type to a segment of another type.

74. Apparatus as in claim 73, adapted to:
identify a segment boundary at the beginning of a blank segment; and
mark the identified segment boundary to cause the blank segment following the identified segment boundary to be excluded from subsequent interaction with the set of visual recording data.

75. Apparatus as in claim 74, wherein the set of visual recording data is used to generate a display of the corresponding recorded visual content, a display of the recorded visual content corresponding to the marked segment not being generated.

76. Apparatus as in claim 74, wherein the set of visual recording data is processed in a specified manner, the visual recording data in the marked segment not being processed.

77. Apparatus as in claim 73, adapted to:
identify a segment boundary at the beginning of a blank segment; and
delete the visual recording data in the blank segment from the set of visual recording data.

78. Apparatus as in claim 73, adapted to:
   determine the duration of a blank segment; and
   identify the end of recorded visual content in the set of visual recording data as the beginning of a blank segment having greater than a specified duration.

79. A method for identifying a blank segment in a set of visual recording data, using a computational device to perform the steps of:
   evaluating a frame of visual recording data to determine whether the frame of visual recording data is a snow-static frame; and
   receiving input regarding blank frame determinations for a plurality of frames of visual recording data and evaluating a characteristic of the plurality of frames of visual recording data to determine whether the plurality of frames of visual recording data is a blank segment that does not correspond to recorded visual content; and
   evaluating, when a frame is determined to be a snow-static frame, the temporal correlation coefficient over a specified window of frames of visual recording data that includes the snow-static frame to either confirm or reject the determination that the frame is a snow-static frame.

80. A computer readable medium or media encoded with one or more computer programs for identifying a blank segment in a set of visual recording data, comprising:
   instructions for evaluating a frame of visual recording data to determine whether the frame of visual recording data is a snow-static frame;
   instructions for receiving input regarding blank frame determinations for a plurality of frames of visual recording data and evaluating a characteristic of the plurality of frames of visual recording data to determine whether the plurality of frames of visual recording data is a blank segment that does not correspond to recorded visual content; and
   instructions for evaluating, when a frame is determined to be a snow-static frame, the temporal correlation coefficient over a specified window of frames of visual recording data that includes the snow-static frame to either confirm or reflect the determination that the frame is a snow-static frame.

81. A method for identifying a blank segment in a set of visual recording data, using a computational device to perform the steps of:
   evaluating a frame of visual recording data to determine whether the frame of visual recording data is a snow-static frame, the step of evaluating a frame of visual recording data further comprising the steps of:
      determining if a specified maximum variation from pure gray at each pixel is less than a specified magnitude;
      determining if the average numerical value of each color component for all of the pixels of the frame is within a specified range and/or has a specified relationship with the average numerical value of one or more other color components; and
      determining if the vertical and horizontal correlation coefficients are within corresponding specified ranges and/or have a specified relationship with one another, wherein:
         if the specified maximum variation from pure gray at each pixel is less than a specified magnitude, the average numerical value of each color component for all of the pixels of the frame is within a specified range and/or has a specified relationship with the average numerical value of one or more other color components, and the vertical and horizontal correlation coefficients are within corresponding specified ranges and/or have a specified relationship with one another, then the frame is a snow-static frame; and
   receiving input regarding blank frame determinations for a plurality of frames of visual recording data and evaluating a characteristic of the plurality of frames of visual recording data to determine whether the plurality of frames of visual recording data is a blank segment that does not correspond to recorded visual content.

82. A computer readable medium or media encoded with one or more computer programs for identifying a blank segment in a set of visual recording data, comprising:
   instructions for evaluating a frame of visual recording data to determine whether the frame of visual recording data is a snow-static frame, the instructions for evaluating a frame of visual recording data further comprising:
      instructions for determining if a specified maximum variation from pure gray at each pixel is less than a specified magnitude;
      instructions for determining if the average numerical value of each color component for all of the pixels of the frame is within a specified range and/or has a specified relationship with the average numerical value of one or more other color components; and
      instructions for determining if the vertical and horizontal correlation coefficients are within corresponding specified ranges and/or have a specified relationship with one another, wherein:
         if the specified maximum variation from pure gray at each pixel is less than a specified magnitude, the average numerical value of each color component for all of the pixels of the frame is within a specified range and/or has a specified relationship with the average numerical value of one or more other color components, and the vertical and horizontal correlation coefficients are within corresponding specified ranges and/or have a specified relationship with one another, then the frame is a snow-static frame; and
   instructions for receiving input regarding blank frame determinations for a plurality of frames of visual recording data and evaluating a characteristic of the plurality of frames of visual recording data to determine whether the plurality of frames of visual recording data is a blank segment that does not correspond to recorded visual content.

83. A method for identifying a blank segment in a set of visual recording data, using a computational device to perform the steps of:
   evaluating a frame of visual recording data to determine whether the frame of visual recording data is a blank frame representing an image that is all or nearly all one color, the step of evaluating a frame of visual recording data further comprising the steps of:
      determining if, for each color component, the numerical value of a specified number of the pixels of the frame is within a specified magnitude of the average numerical value of that color component for all of the pixels of the frame; and
      determining if the average numerical value of each color component for all of the pixels of the frame is within a specified range and/or has a specified relationship with the average numerical value of one or more other color components, wherein:
         if, for each color component, the numerical value of the specified number of the pixels of the frame is within the specified magnitude of the average numerical value of that color component for all of the pixels of the frame, and if the average numerical value of each color component for all of the pixels of the frame is within a specified range and/or has a specified relationship with the average numerical value of one or more other color components, then the frame is a blank frame;

the numerical value of each color component or each pixel can vary between 0 and 255 inclusive;

the specified number of pixels is greater than or equal to 80% of the pixels; and the specified magnitude is 8; and receiving input regarding blank frame determinations for a plurality of frames of visual recording data and evaluating a characteristic of the plurality of frames of visual recording data to determine whether the plurality of frames of visual recording data is a blank segment that does not correspond to recorded visual content.

84. A computer readable medium or media encoded with one or more computer programs for identifying a blank segment in a set of visual recording data, comprising:

instructions for evaluating a frame of visual recording data to determine whether the frame of visual recording data is a blank frame representing an image that is all or nearly all one color, the instructions for evaluating a frame of visual recording data further comprising:

instructions for determining if, for each color component, the numerical value of a specified number of the pixels of the frame is within a specified magnitude of the average numerical value of that color component. for all of the pixels of the frame; and instructions for determining if the average numerical value of each color component for all of the pixels of the frame is within a specified range and/or has a specified relationship with the average numerical value of one or more other color components, wherein:

if, for each color component, the numerical value of the specified number of the pixel of the frame is within the specified magnitude of the average numerical value of that color component for all of the pixels of the frame, and if the average numerical value of each color component for all of the pixels of the frame is within a specified range and/or has a specified relationship with the average numerical value of one or more other color components, then the frame is a blank frame;

the numerical value of each color component of each pixel can vary between 0 and 255 inclusive;

the specified number of pixels is greater than or equal to 80% of the pixels; and the specified magnitude is 8; and instructions for receiving input regarding blank frame determinations for a plurality of frames of visual recording data and evaluating a characteristic of the plurality of frames of visual recording data to determine whether the plurality of frames of visual recording data is a blank segment that does not correspond to recorded visual content.

* * * * *